United States Patent [19]

Hashimoto

[11] Patent Number: 5,140,365
[45] Date of Patent: Aug. 18, 1992

[54] COPYING SYSTEM

[75] Inventor: Kenji Hashimoto, Komae, Japan

[73] Assignee: Ricoh Company, Ltd., Tokyo, Japan

[21] Appl. No.: 686,859

[22] Filed: Apr. 18, 1991

Related U.S. Application Data

[63] Continuation of Ser. No. 418,887, Oct. 10, 1989, abandoned.

[30] Foreign Application Priority Data

Oct. 14, 1988 [JP] Japan .................. 63-257234

[51] Int. Cl.⁵ .............................. G03B 27/48
[52] U.S. Cl. ........................ 355/50; 355/308
[58] Field of Search ............ 355/50, 75, 308, 309

[56] References Cited

U.S. PATENT DOCUMENTS

| | | | |
|---|---|---|---|
| 3,493,301 | 2/1970 | Sable | 355/64 |
| 4,087,172 | 5/1978 | Van Dongen | 355/308 |
| 4,614,421 | 9/1986 | Nishiyama | 355/14 CU |

FOREIGN PATENT DOCUMENTS

| | | |
|---|---|---|
| 1522880 | 10/1969 | Fed. Rep. of Germany . |
| 2062972 | 6/1977 | Fed. Rep. of Germany . |
| 3521028 | 12/1987 | Fed. Rep. of Germany . |
| 59-72455 | 4/1984 | Japan . |
| 59-72456 | 4/1984 | Japan . |

Primary Examiner—L. T. Hix
Assistant Examiner—Khanh Dang
Attorney, Agent, or Firm—Oblon, Spivak, McClelland, Maier & Neustadt

[57] ABSTRACT

A copying system has an automatic document feeder capable of feeding continuous original. This system has a device for inputting the number of sheets of the original to be copied, a counter for counting the number of copied sheets of the original, a comparator for comparing data outputted from the inputting device and the counter with each other, a body controller for controlling the copying operation of the copying system, and a feeder controller for outputting commands for feeding and discharging the sheets of the original to the automatic document feeder by the data from the comparator. The feeder controller outputs a copy processing signal to the body controller.

7 Claims, 14 Drawing Sheets

COPYING SYSTEM

This application is a continuation of application Ser. No. 07/418,887, filed on Oct. 10, 1989, now abandoned.

BACKGROUND OF THE INVENTION

The present invention relates to a copying system for performing a copying operation by using a computer form paper, i.e., a folding continuous paper as an original.

The copying system of this kind is known and disclosed in Japanese Laid-Open Patent Publication No. 59-72455 for example. In such a conventional system, in addition to the normal original composed of separate paper sheets, a computer outputting form paper (which is called a CF paper in the following description) is fed as the original onto a platen to perform the copying operation. This system is provided with a paper feeding port commonly used for the normal original and the CF paper original and detects whether the original inserted into the paper feeding port is the normal original or the CF paper original. Thus, controls for feeding these originals are automatically switched with respect to each other.

In the above conventional system, when the continuous CF paper is copied, all the set sheets of the original are copied. However, in the case of the individual originals, it is sufficient to set only a necessary original. In contrast to this, in the case of the CF paper, when only a necessary page of the sheets of the original is copied, the copying operation must be performed by separating the continuous sheets of the CF paper from each other.

SUMMARY OF THE INVENTION

It is therefore an object of the present invention to provide a copying system for copying a necessary portion of the CF paper without separating this necessary portion from the other portions of the CF paper.

The above object of the present invention can be achieved by a copying system having an automatic document feeder capable of feeding a continuous original. This system comprises a device for inputting the number of sheets of the original to be copied, a counter for counting the number of copied sheets of the original, a comparator for comparing data outputted from the inputting device and the counter with each other, a copying machine body controller for controlling the copying operation of the copying system, and a feeder controller for outputting commands for feeding and discharging the sheets of the original to the automatic document feeder by the data from the comparator. The feeder controller outputs a copy processing signal to the body controller.

In accordance with the above construction, the data outputted from the inputting device and the counter are inputted to the comparator. The compared results by the comparator are outputted to the feeder controller. By these data, the commands for feeding and discharging the original are outputted to the automatic document feeder from the feeder controller. The copy processing signal is outputted to the body controller from the feeder controller. Accordingly, a necessary portion of the continuous CF paper can be copied by commanding the page number thereof. Therefore, only the necessary portion can be copied without separating this necessary portion of the CF paper from the other portions thereof.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a copying system in accordance with the present invention will next be described in detail with reference to the accompanying drawings.

Figure 1:
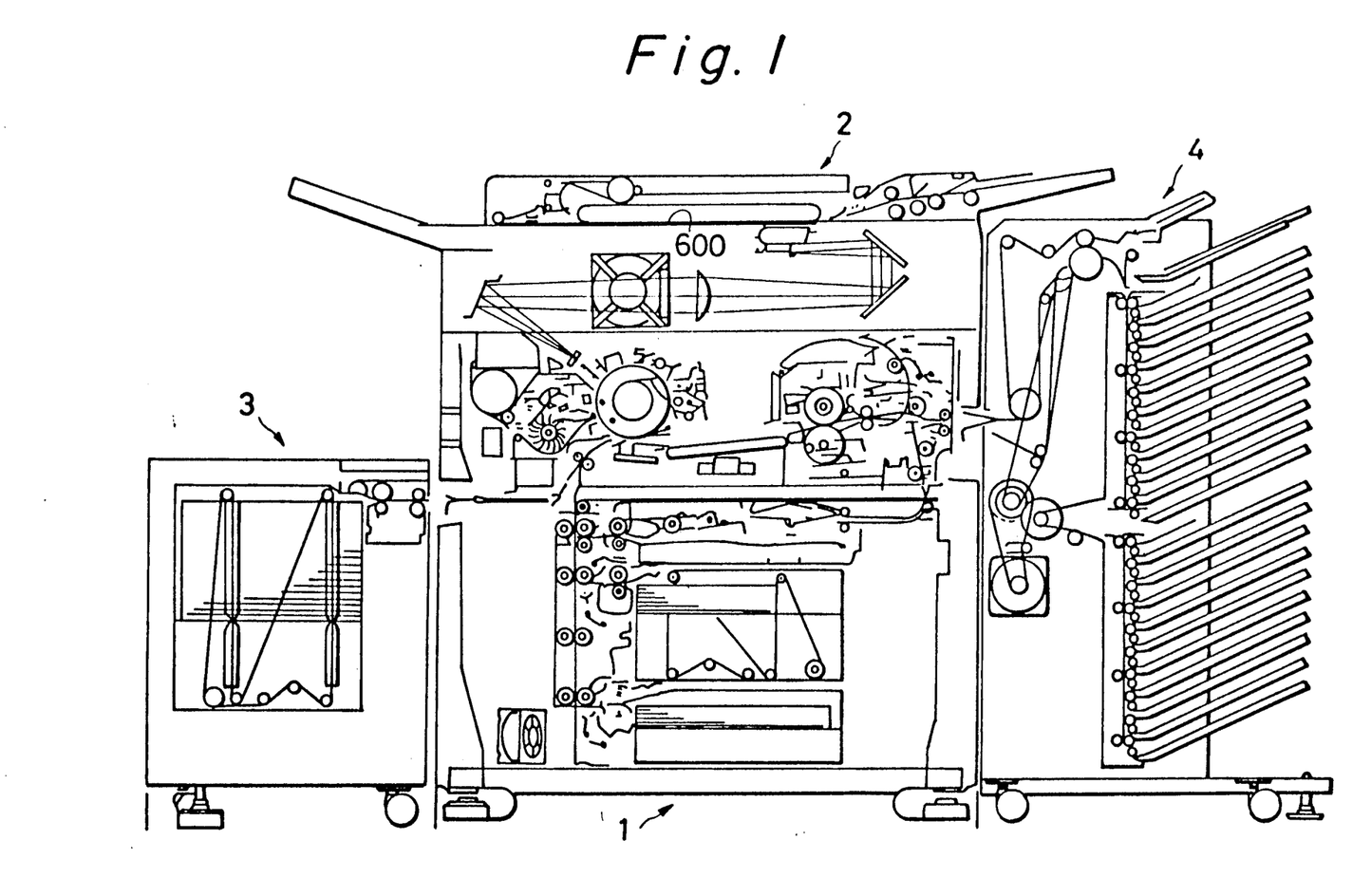
FIG. 1 is a schematic view showing the entire construction of a copying machine to which a copying system in accordance with the present invention is applied.

FIG. 1 is a schematic view showing the entire construction of a copying machine to which a copying system in the present invention is applied. In this FIGURE, reference numeral 1 designates a body of the copying machine, 2 an automatic document feeder (which is called ADF in the following description), 3 a unit for feeding a large amount of sheets of paper, and reference numeral 4 designates a sorter.

In FIG. 1, the ADF 2 is arranged on a platen 600 of the copying machine body 1 and feeds an original onto the platen 600. A face for supporting the original on this platen is scanned by an illuminating light to copy an image of the original onto a sheet of copying paper supplied from the paper feeding unit 3, and on the copying paper is then performed a sorting operation by the sorter 4.

Figure 2:
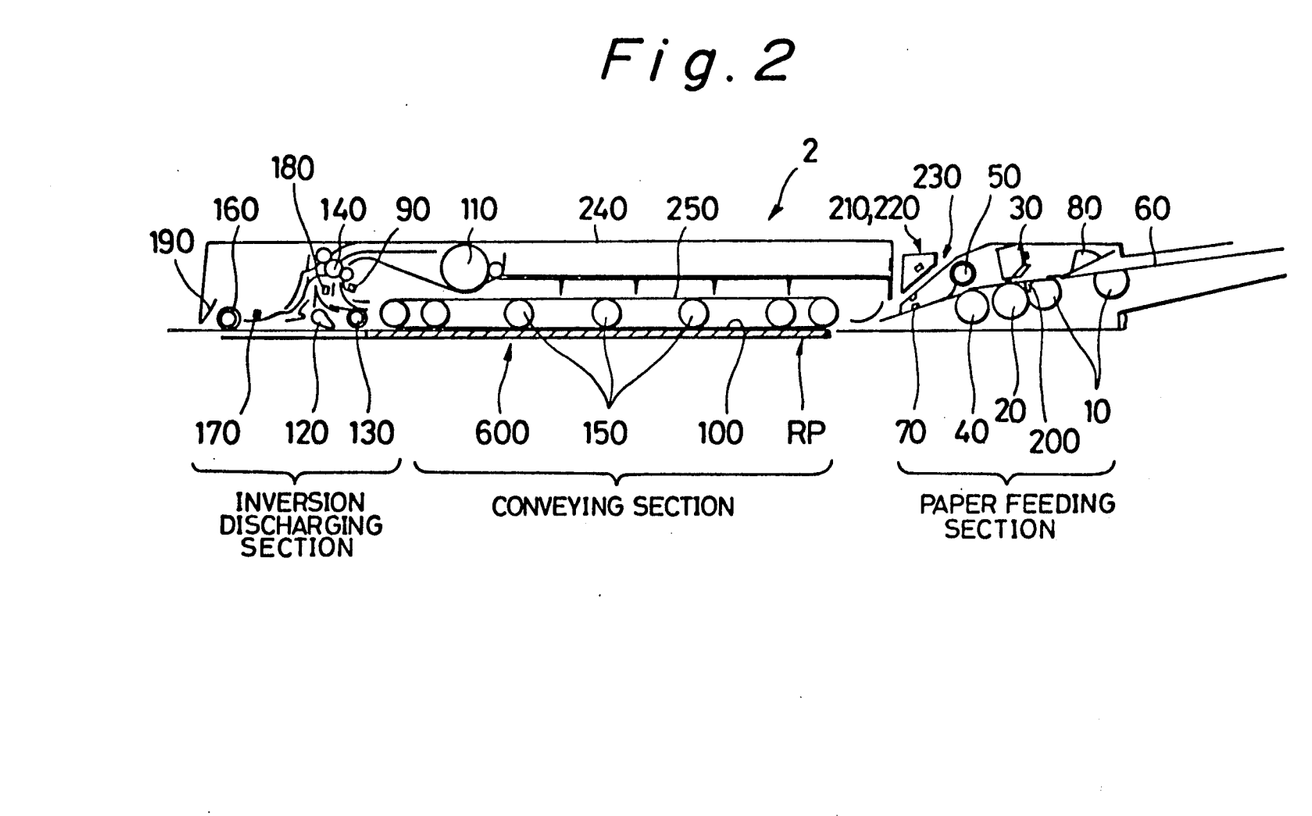
FIG. 2 is a constructional view of an automatic document feeder (which is called ADF in the following description) section of the copying machine in FIG. 1.

FIG. 2 is a constructional view of the ADF 2 in FIG. 1. In FIG. 2, reference numeral 10 designates calling rollers, 20 a separating roller, 30 a separating blade, 40 a pull-out roller on a driven side, 50 a pull-out roller on a driving side, 60 a table for setting the original thereon, 70 a resist-sensor SN2 for detecting the size of the original, 80 an inlet guide cover, 90 an inversion resist-sensor SN, and reference numeral 100 designates a belt for conveying the original. This belt is composed of an endless belt and is disposed within an opening/closing cover 240 of the ADF 2. Further, reference numeral 110 designates a turn roller, 120 a switching claw for inversion, 130 an intermediate conveying roller, 140 an inversion drive roller, 150 a press roller, 160 a conveying roller, 170 a paper discharging sensor SN4, 180 an inversion inlet sensor SN5, and reference numeral 190 designates an electricity removing brush. Reference numeral 200 designates a sensor SN1 for setting the original, 210 a sensor SN6 for detecting a hole of the CF paper, 220 a sensor SN7 for detecting the CF paper original, and reference numeral 230 designates a port for feeding the CF paper original.

In FIG. 2, it is possible to perform the copying operation if the normal original is set on the original setting table 60 in a state in which the original setting sensor SN1(200) is turned on by an end of the original. In this state, when a print switch in the copying machine is pushed down, the ADF 2 starts to feed the sheets of paper based on a paper feeding command from the copying machine body 1.

The original is moved forward by the rotation of the calling rollers 10 and only a sheet of the original located in the lowermost position reaches the pull-out rollers 40, 50 by the operations of the separating roller 20 and the separating blade 30. When the rear end of the original passes through the resist-sensor SN2(70), the operation of the original conveying belt 100 is stopped after the original has moved by a predetermined distance. At this time, the copying system is controlled such that the rear end of the original is located in a reference position RP of the original.

When the original is stopped on the platen 600, an optical system in the copying machine is operated and an image of the original is formed on a drum. After a predetermined number of copies is completed, the copying machine gives a paper feeding command to the ADF 2 with respect to the next sheet of the original and gives a paper discharging command to the ADF 2 so as to discharge the copied sheet of the original. To improve the copying efficiency, before the original on the previous page is completely copied, the paper feeding operation is started with respect to the next original and the original on the previous page is next discharged. To replace the originals efficiently in this way, a portion of the previous original is located on the original conveying belt when the next original is stopped on the platen 600, but this previous original is discharged without stopping the movement thereof by the driving force of the intermediate conveying roller 130.

The CF paper feeding port 230 is disposed as a paper feeding port in the case of the copying operation of the CF paper original. The CF hole detecting sensor SN6(210) and the CF paper detecting sensor SN7(220) are disposed in the vicinity of the paper feeding port 230. A guide plate for guiding the CF paper is disposed in the vicinity of the paper feeding port 230 to prevent the skew of the CF paper. There is no conveying means in this CF paper feeding port 220.

Figure 3:
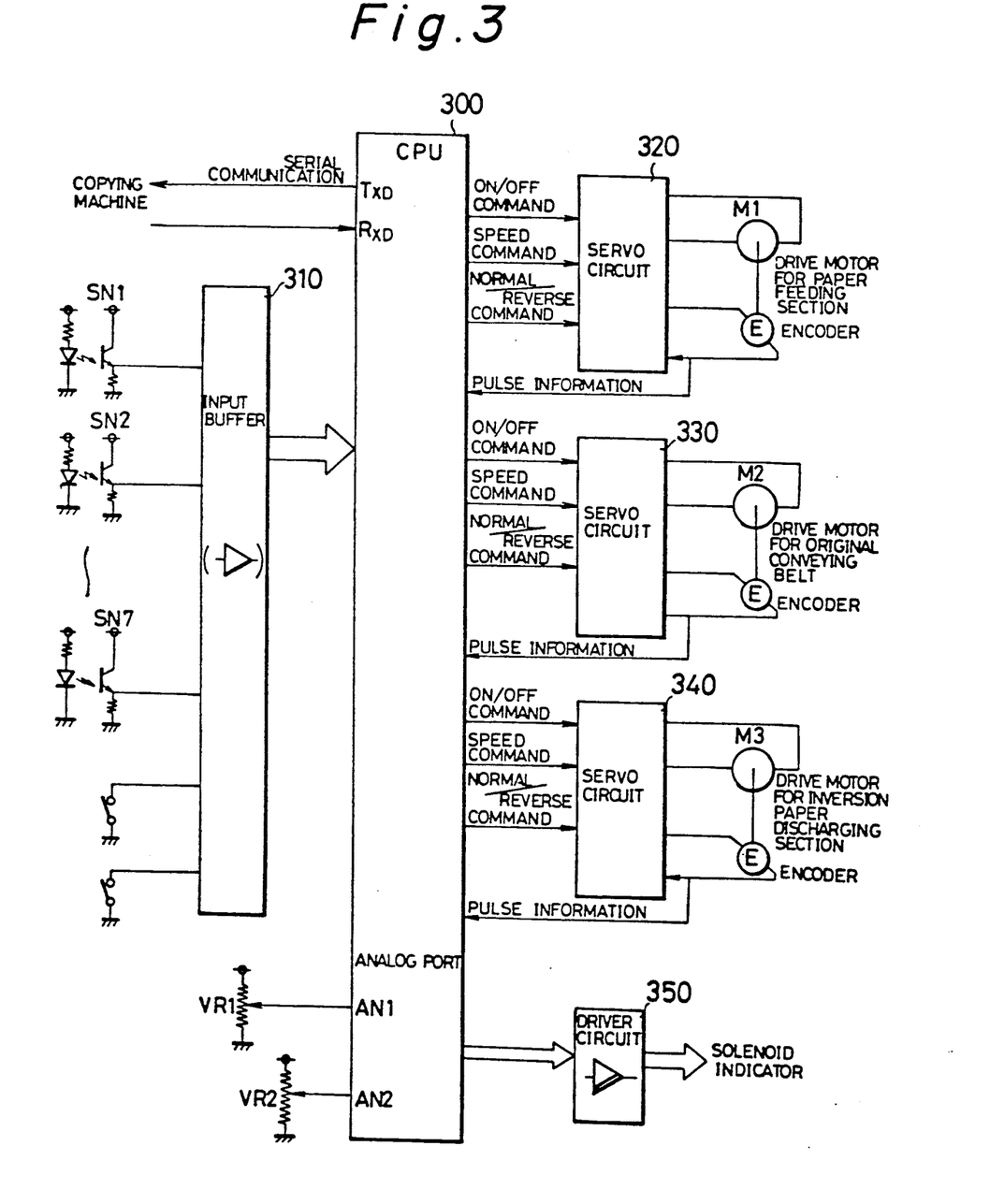
FIG. 3 is a block diagram of a control circuit of the ADF section.

FIG. 3 is a block diagram of a control circuit of the ADF. In this FIGURE, reference numeral 300 designates a CPU, 310 an input buffer, 320, 330 and 340 servo circuits, and reference numeral 350 designates a driver circuit.

In FIG. 3, information is retransmitted between the copying machine body and the ADF by using serial communication.

The ADF is constructed with an input section with respect to each of the sensors, three servo circuits 320, 330 and 340 for driving respective motors M1, M2 and M3 in a paper feeding section, a conveying section and an inversion paper discharging section, and a driver circuit 350 for controlling the drive of other constructional elements. Each of the servo circuits is operated in accordance with the commands of the CPU 300 by receiving therefrom an ON/OFF command for turning the motor on and off, a command for controlling the rotary speed of the motor (this command is outputted from the CPU 300 by data of 6 bits), and a signal indicative of the rotary direction of the motor. A pulse signal from an encoder E attached to each of the motors is used to control the rotary speed of each motor and a pulse information is supplied to the CPU 300.

The CPU 300 mainly controls the position of the original based on this pulse information. This pulse signal is also used to detect the abnormal operation of each motor.

The CPU 300 has analog ports such as NEC, μPD7810, etc., and variable resistors VR1, VR2 are respectively connected to analog ports AN1, AN2 of the CPU 300. The resistance values of the resistors VR1, VR2 are supplied to the CPU 300 with resolution 256. This information is used to adjust the stopping position of the original. There is a slight dispersion in construction depending on copying machines. For example, in a certain copying machine, when the counting number of pulses is 640, for example, until the original position reference after the original has passed through the resist-sensor SN2(70), the resistance value of the resistor VR1 is changed in accordance with this pulse counting number. In the case of a software design, it is possible to adjust the resistance value of the resistor VR1 when an analog value of the VR1 is added to 600 with the 600 pulses a fixing value, for example.

Figure 4:
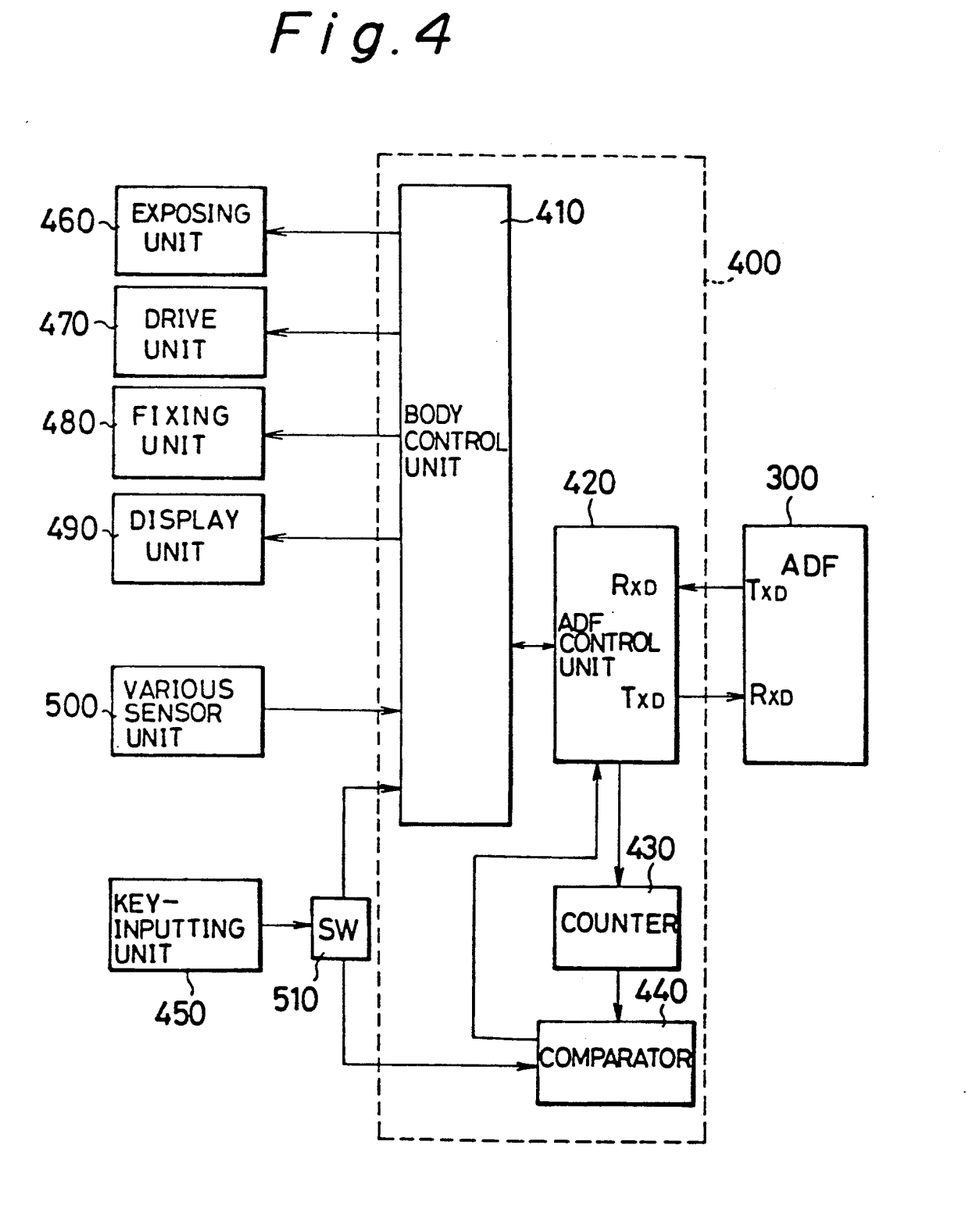
FIG. 4 is a block diagram of a control circuit of the copying machine.

FIG. 4 is a block diagram of a control circuit of the copying machine body 1. In this FIGURE, reference numeral 400 designates a CPU, 410 a body control unit, 420 a unit for controlling the operation of the ADF, 430 a counter, 440 a comparator, 450 a key-inputting unit, 460 an exposing unit, 470 a drive unit, 480 a fixing unit, 490 a display unit, 500 various sensor unit, and reference numeral 510 designates a change-over switch.

The CPU 400 of the copying machine body 1 is provided with the ADF control unit 420 to perform the serial communication with the ADF so as to control the operation of the ADF. The body control unit 410 is disposed in the CPU 400 and receives a copy processing signal from the ADF control unit 420. A signal indicative of the number of copied sheets of the original from the ADF is inputted to the counter 430 to perform the counting operation. Data of this counter 430 are inputted to the comparator 440. Data indicative of the set number of sheets of the original are inputted by the key-inputting unit 450 as a unit for inputting the set number of sheets of the original and are then inputted to the comparator 440. The compared results of these data are inputted from the comparator 440 to the ADF control unit 420. This ADF control unit 420 outputs the signals for feeding and discharging the original paper as mentioned above, and simultaneously outputs a copy processing signal to the body control unit 410. This body control unit 410 controls a condition for forming the image by a signal from the various sensor unit 500 for detecting the copying state, and controls the operations of the exposing unit 460, the drive unit 470, the fixing unit 480, the display unit 490, etc. The above key-inputting unit 450 is commonly used as the conventional key-inputting unit for inputting the number of copies, and a key-inputting unit for setting the number of sheets of the original. This key-inputting unit is switched with respect to each other by the change-over switch 510.

Figure 5A:
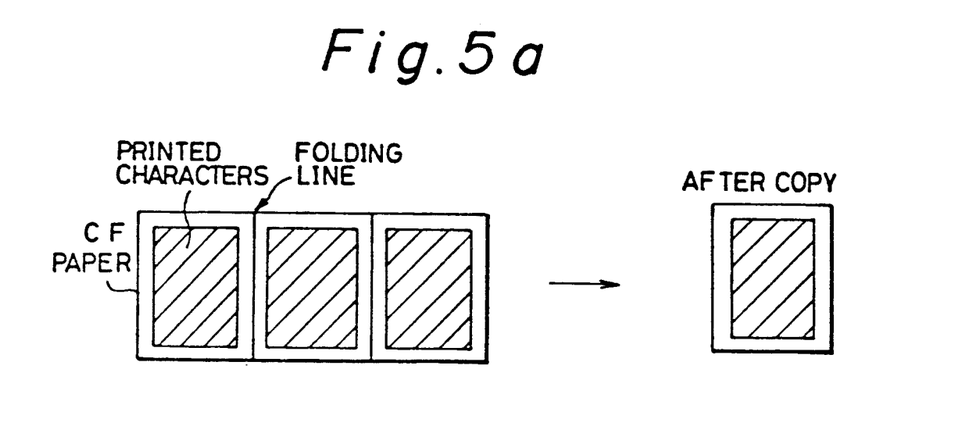
FIGS. 5a and 5b are views for explaining the copying operation by using a computer paper original.

When the CF paper is copied, the cover 240 is first opened and an endless belt 250 in the conveying section is separated from the platen. Then, as shown in FIG. 5a, a first page of the CF paper pulled out of the CF paper feeding port 230 is set on the platen such that a folding line of the CF paper is normally aligned with the position reference of the original. In this case, the CF paper, after the second page thereof, is set on the original setting table 60 through the CF paper feeding port 230, or is arranged onto another place.

After the above processing, the cover 240 is returned to its original place and the CF paper is held by the endless belt 250 and the platen therebetween. When the print switch of the copying machine is then turned on, the first page of the CF paper is first exposed and copied and the subsequent pages thereof are sequentially fed, exposed and copied.

Figure 5B:
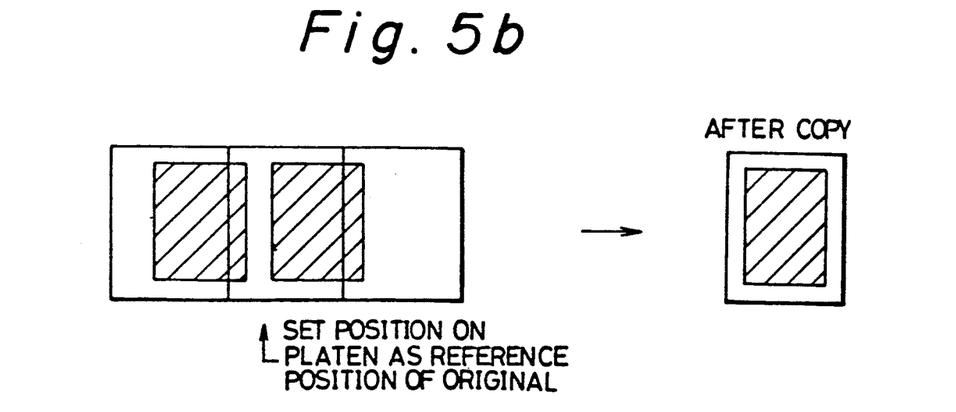

As shown in FIG. 5b, when the positions of printed characters on the CF paper are displaced from the folding line of the CF paper by an unsuitable setting method thereof in the case of the printing operation of the CF paper, a partition of the printing positions is set to be located in the reference position of the original when the CF paper is set on the platen, thereby performing the copying operation in a state in which the printing positions of the CF paper are normal.

As mentioned above, the CF paper is thus fed sequentially and the final page thereof is copied and then discharged so that the above sequential processings are completed.

The above processings will next be described with reference to the flow charts shown in FIGS. 6a to 6l explaining the operation of the copying system when the CF paper is used in the embodiment of the present invention.

Figure 6A:
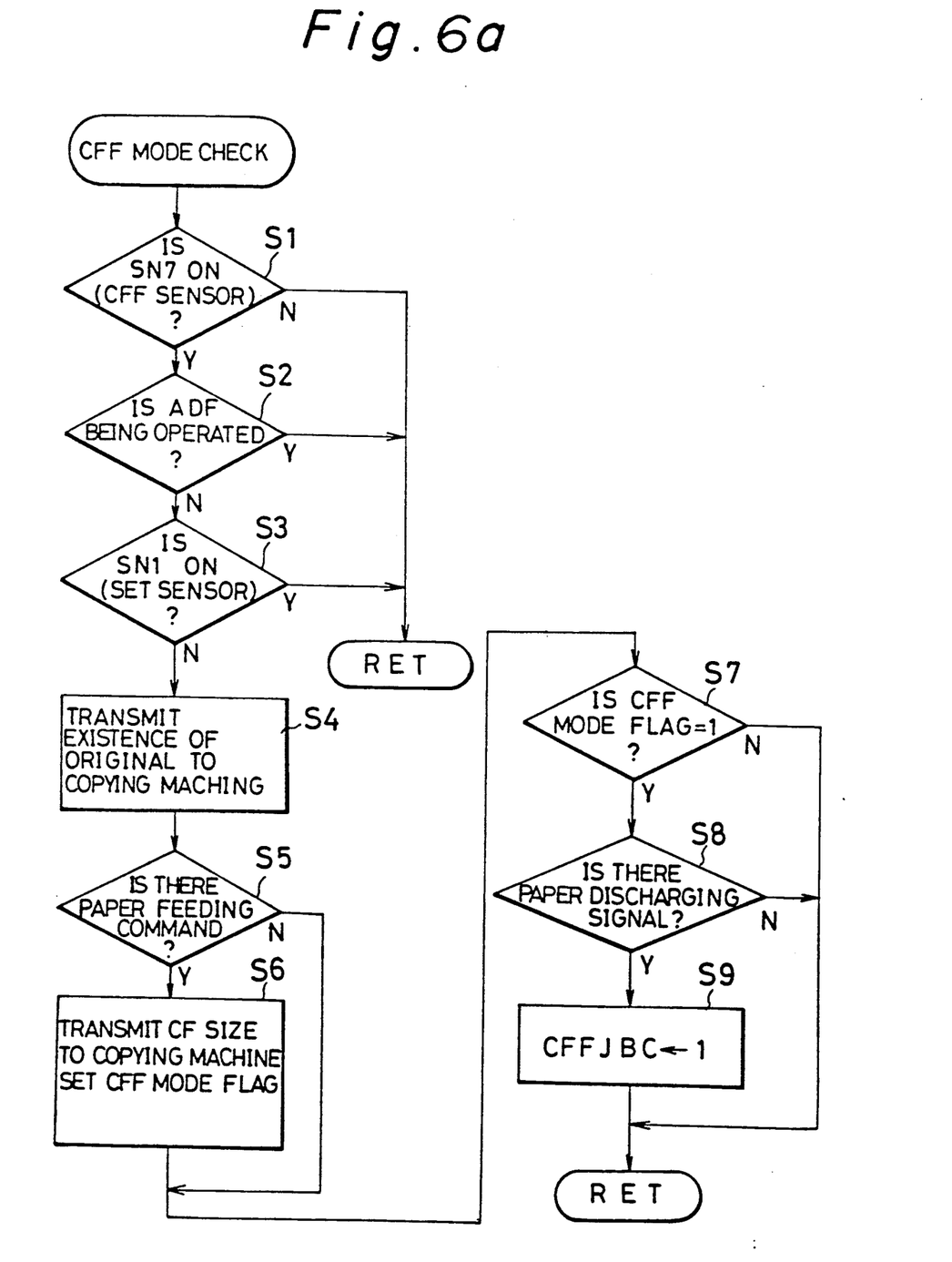
FIGS. 6a to 6l are flow charts for explaining the operation of the copying system in an embodiment of the present invention.

FIG. 6a shows a CFF mode checking routine for checking whether a CF mode is started or not. In this FIGURE, when the sensor SN7 (220) is turned on (when the CF paper is fed from the CF paper feeding port 230 in a step S1), the ADF is not used because of the normal paper (step S2). Therefore, a CFF operation is set to be started when the normal original is not set on the original setting table 60 (step S3). This construction shows that the normal original has a priority higher than that of an uncommon original. Under the above conditions, when the CF original is fed, a signal indicating the existence of the original is transmitted from the ADF to the copying machine body side (step S4). It is then judged that the original is set on the ADF by information indicative of the existence of the original from the ADF on the copying machine body side. Therefore, when the print switch of the copying machine is thus pushed down, a paper feeding command for instructing the paper feeding operation of the original is transmitted onto the ADF side (step S5). In the case of the normal original, the ADF starts the paper feeding operation by a signal indicative of this command. At the time of the CF operation, a signal indicative of the size of the CF paper is transmitted to the copying machine when the paper feeding command is applied (step S6). This signal is used as information for automatically selecting the papers used in the copying machine and automatically performing a zooming operation.

As mentioned above, the ADF is apparently not operated irrespective of the transmission of the paper feeding command from the copying machine at the time of the CF operation. This is because it is not necessary to know the difference in kind between the normal original and the CF original to perform the control operation of the copying machine, thereby facilitating the control operation. It is also possible to transmit the information of the CF original onto the copying machine side so as to perform the control operation as the CF original. A CFF mode flag is set on the ADF side by the paper feeding command (step S7). This flag is to check whether the ADF is set to the CFF mode or not.

Next, after the exposing operation has been completed in the copying machine, the command for discharging the copied original is transmitted to the ADF (step S8). The ADF sets a CFF-operating counter CFFJBC for performing the CF operation to 1 by this discharging command (step S9). A series of subsequent operations are described in the flow charts shown in FIGS. 6c to 6j.

Figure 6B:
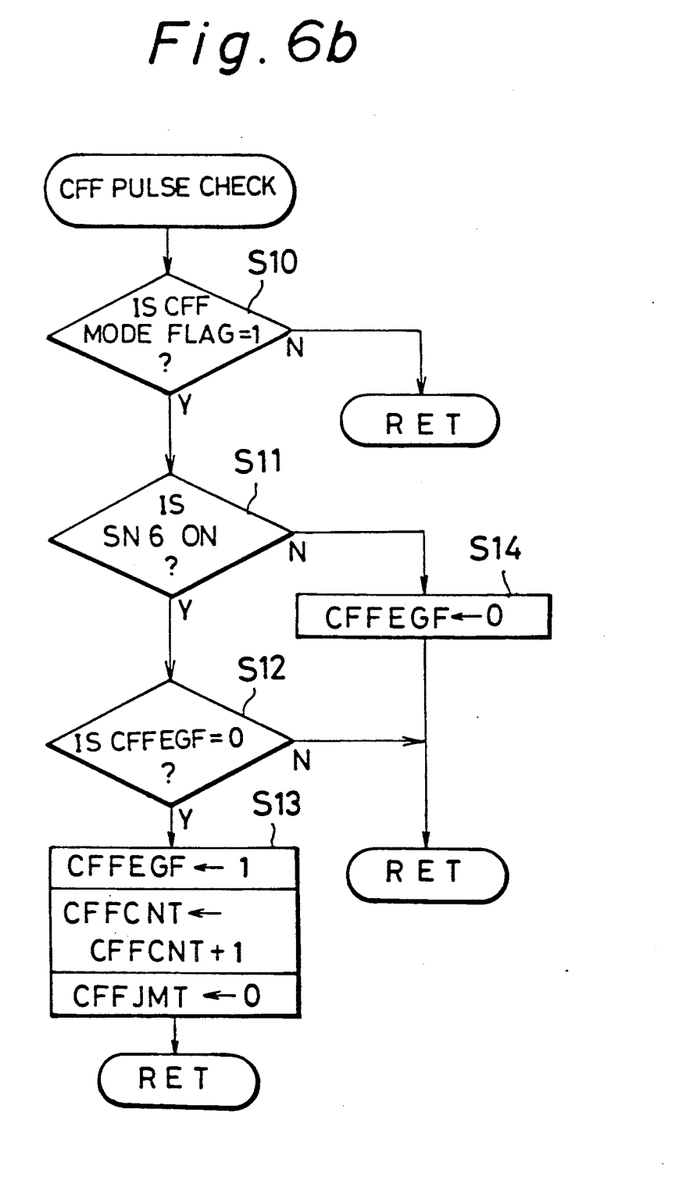
Figure 6C:
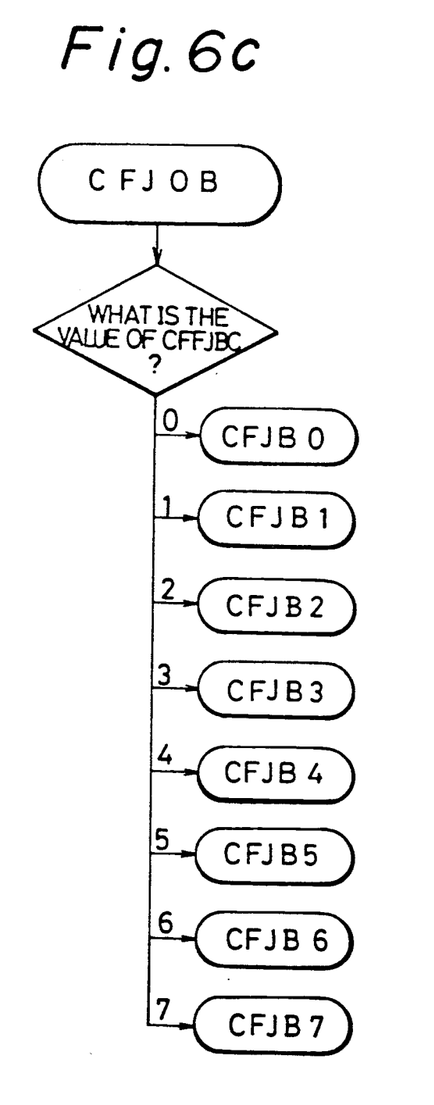
Figure 6D:
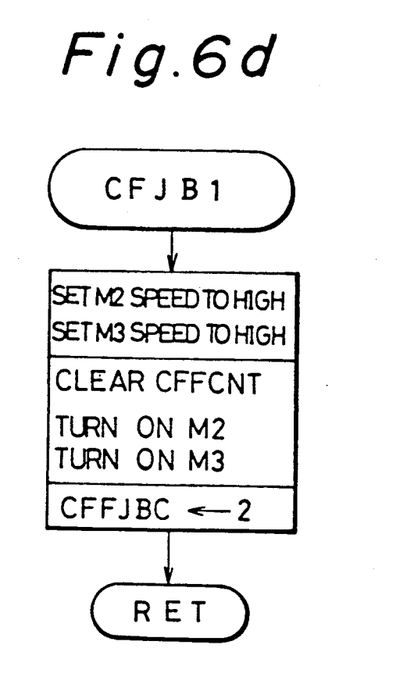

In a CFF pulse checking routine shown in FIG. 6b, it is judged whether the CFF mode flag rises or not (step S10) and whether the CF hole sensor SN6 (210) is turned on or not (step S11). It is also judged whether a flag CFFEGF for checking an edge of the hole of the CF paper is set to "0" or not (step S12). Further, a sprocket hole of the CF paper is detected to count the number of holes (CFFCNT), and a timer CFFJMT for checking the jam of the CF paper is cleared (step S13). When the sensor SN6 (210) is not turned on, the flag CFFEGF is set to "0" (step S14).

This processing is performed at the edge of the hole. Namely, this processing is performed at a time interval from the time when the hole of the CF paper is not detected to the time when this hole is detected.

The steps subsequent to the step S9 in FIG. 6a will next be described with reference to FIGS. 6c to 6j.

Figure 6E:
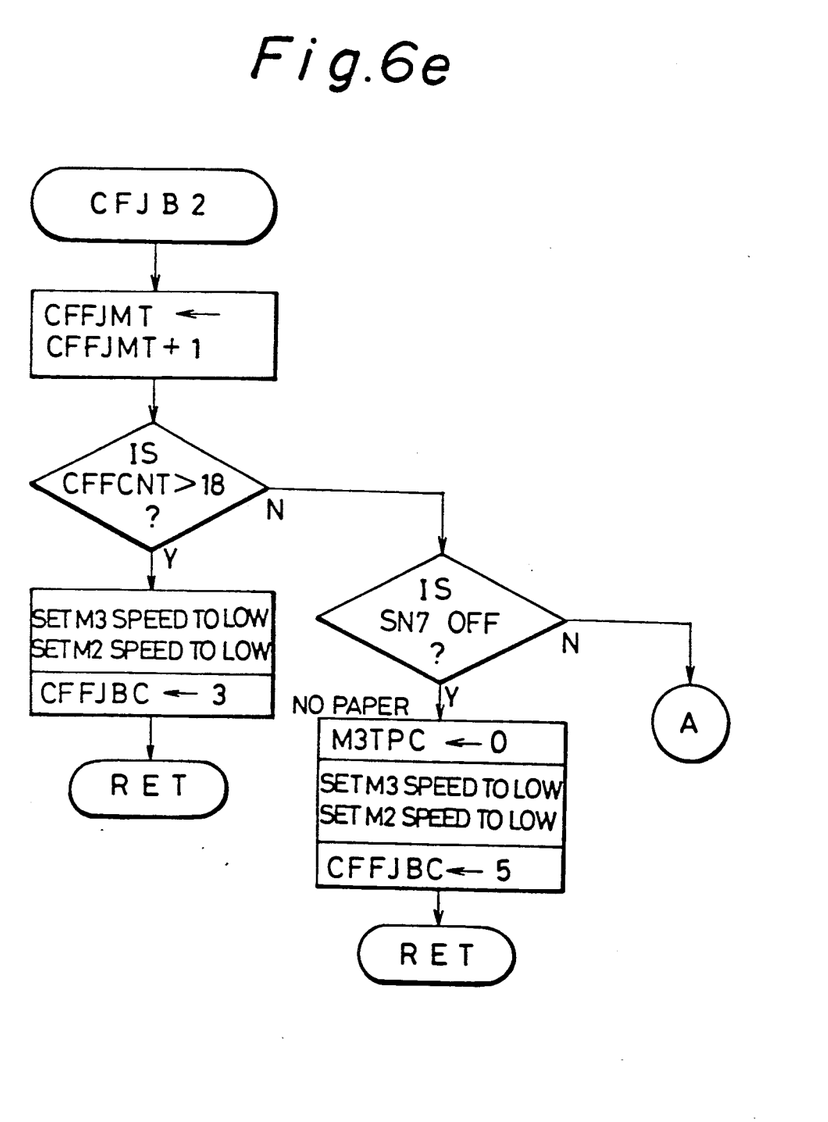

When the ADF receives the paper discharging command as mentioned above, the counter CFFJBC is set to "1". Therefore, in a CFJOB routine shown in FIG. 6c, a multi-jump is performed by the counting number of the counter CFFJBC. When the value of CFFJBC is "0", the program is jumped to a routine CFJB0 shown in FIG. 6l. When the counting number of the counter CFFJBC is "1", the program is jumped to a routine CFJB1 shown in FIG. 6d. In the routine CFJB1, speed commands of the motor M2 in the conveying section and the motor M3 in the inversion paper discharging section are first set such that these motors are rotated at a high speed. Then, these motors M2 and M3 are turned on. The counter CFFCNT for counting the number of holes of the original is simultaneously cleared and the counter CFFJBC is set to "2". When the counter CFFJBC is set to "2", a routine CFJB2 shown in FIG. 6e is executed by the multi-jump in the routine CFJOB shown in FIG. 6c.

In the routine CFJB2, an incremental operation of a counter for the timer CFFJMT is performed every start of the routine CFJB2. This counter is cleared every detection of the CF paper in the above-mentioned CFF pulse checking routine and detects the jam of the paper when the counting operation is performed for a time longer than the time interval of the holes of the normally conveyed paper (see a section A of a routine CFJB3 in FIG. 6f). When the number of holes has become a predetermined number such as 18, for example, the rotary speeds of the motors M2 and M3 are reduced to low speeds and the counter CFFJBC is set to "3". On the other hand, when the copying system runs out of the CF paper in the CF paper feeding port 230 before the number of holes has reached the predetermined number (i.e., the final page), a counter M3TPC for counting an encoder pulse of the motor M3 is cleared and the rotary speeds of the motors M2 and M3 are set to low speeds and the counter CFFJBC is set to "5". Namely, when the running-out page of the CF paper is not the final page, the counter CFFJBC is set to "3".

However, the counter CFFJBC is set to "5" at the time of the final page.

The rotary speeds of the motors are set to low speeds so as to improve the accuracy in stoppage of the CF paper.

Figure 6F:
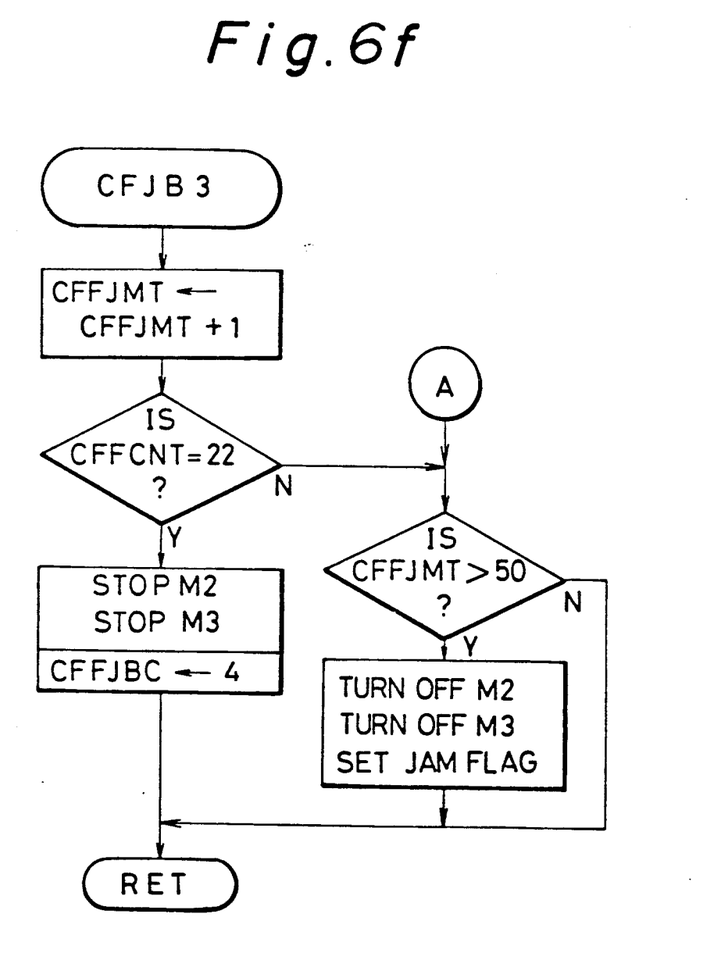

In the routine CFJB3 shown in FIG. 6f, the incremental operation of the counter for the timer CFFJMT is performed as well as the above routine CFJCB2. When the counting number of the counter CFFCNT has reached a predetermined number such as 22, for example, in the case of the CF paper having a length of 11 inches, the motors M2 and M3 are braked to rapidly stop the operations thereof. Thereafter, the counter CFJBC is set to "4". Before the counter CFFCNT has reached the predetermined number, the timer CFFJMT is checked to check whether the CF paper is jammed or not. In this embodiment, the timing of the counter CFFCNT is counted about every 20 to 30 msec (every one half inch), and the timer CFFJMT is counted up every 2 to 3 msec. Accordingly, at the normal time, the timer CFFJMT is cleared when 10 to 15 pulses are counted so that this timer does not reach pulse counts of more than 50 pulses. In accordance with the reverse calculation, when the hole of the CF paper cannot be detected at a time interval longer than 100 to 150 msec, the jam is detected and the motors M2 and M3 are turned off and a JAM flag is set. This JAM flag is used to perform various kinds of jam processings.

Figure 6G:
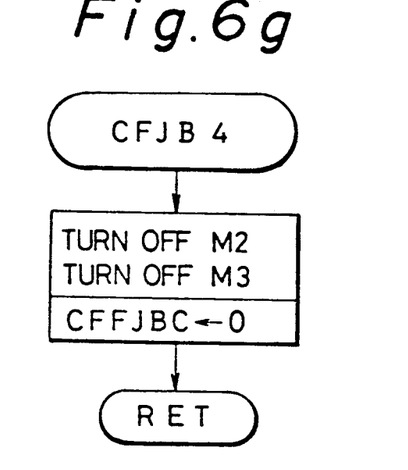
Figure 6H:
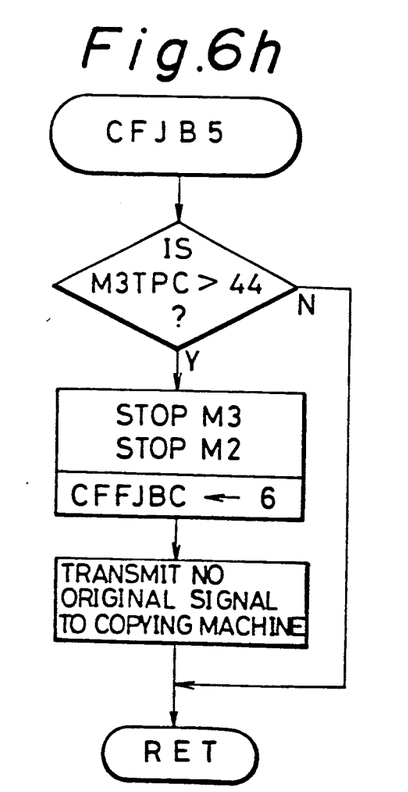

In a routine CFJB4 shown in FIG. 6g, the movement of the CF paper is stopped and the motors M2 and M3 are turned off and the counter CFFJBC is set to "0" so as to set the initial state thereof. On the other hand, in the case of the processing of the final paper, when the final paper is detected in the routine CFJB2, the counter CFFJBC is set to "5" and it then proceeds to a routine CFFJB5 shown in FIG. 6h. In the routine CFFJB5, the control for stopping the CF paper is performed by the pulse control using the encoder pulses of the motors from the detection of the hole of the CF paper. After the CF paper is moved by a predetermined distance, the motors M2 and M3 are rapidly braked and then stopped. Further, the counter CFFJBC is set to "6" and a signal indicative of the non-existence of the original is transmitted to the copying machine body to inform of the final original.

Figure 6I:
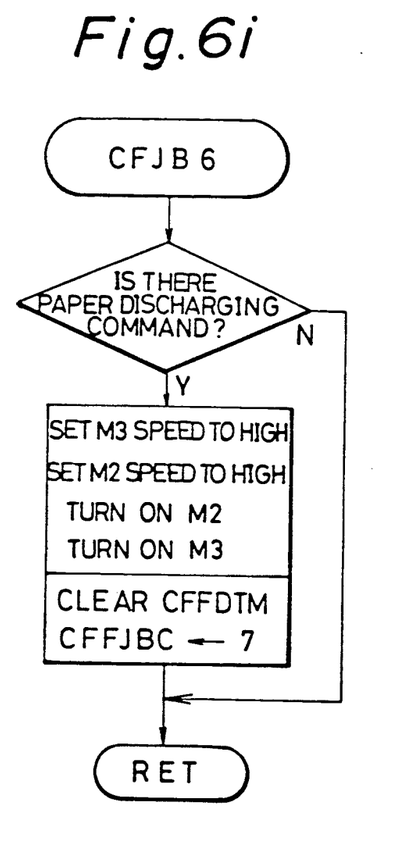

In a routine CFFJB6 shown in FIG. 6i, the motors M2 and M3 are operated at a high speed by the paper discharging command from the copying machine so as to discharge the CF paper. Further, the counter CFFJBC is set to "7" and a timer CFEDTM for discharging the final sheet of the CF paper is cleared.

Figure 6J:
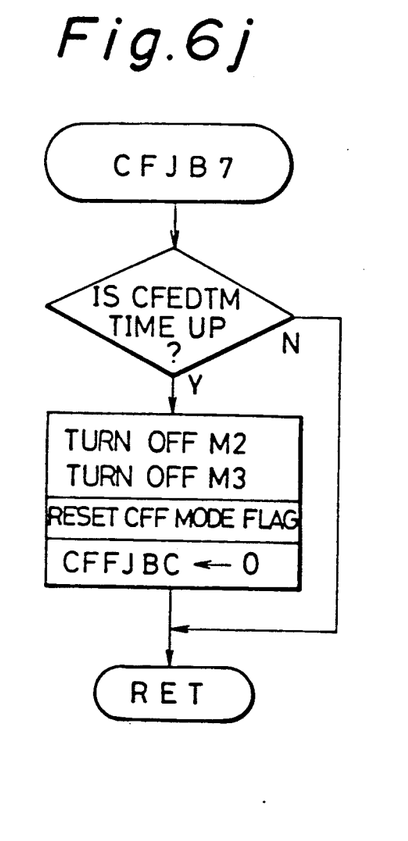

In a routine CFFJB7 shown in FIG. 6j, after the time-up of the timer CFEDTM, the motors M2 and M3 are turned off and the counter CFFJBC is set to "0" so as to set the initial state, thereby completing the sequential CF mode.

With respect to the entire flow, the routines CFFJB0 to CFFJB4 are repeatedly executed while the CF paper is continuously copied. In the copying operation of the final sheet of the CF paper, the routines CFFJB0, CFFJB1, CFFJB2, CFFJB5, CFFJB6 and CFFJB7 are executed.

The copying operation with respect to a necessary portion of the CF paper will next be described. For example, when the CF paper has 200 pages and the copying operation is performed with respect to the 11th page to the 50th page of the CF paper, the folding line on the 11th page (the folding line between the 11th and 12th pages) is set to be in conformity with the reference position of the original in the ADF shown in FIG. 2. The CF paper before the 10th page thereof is set to be externally arranged through the paper discharging section of the ADF (see FIG. 1). Next, the amount of pages to be copied (40 pages in this example) is inputted by the key-inputting unit 450 on the copying machine side. Then, the print switch is pushed down in the copying machine so that the copying machine starts the sequential copying operations and completes the copying operation with respect to the 40 pages. The copying operation is thus completed and the operation of the ADF is also completed.

The above-mentioned operations will next be described in detail with reference to the flow chart shown in FIG. 6k.

Figure 6K:
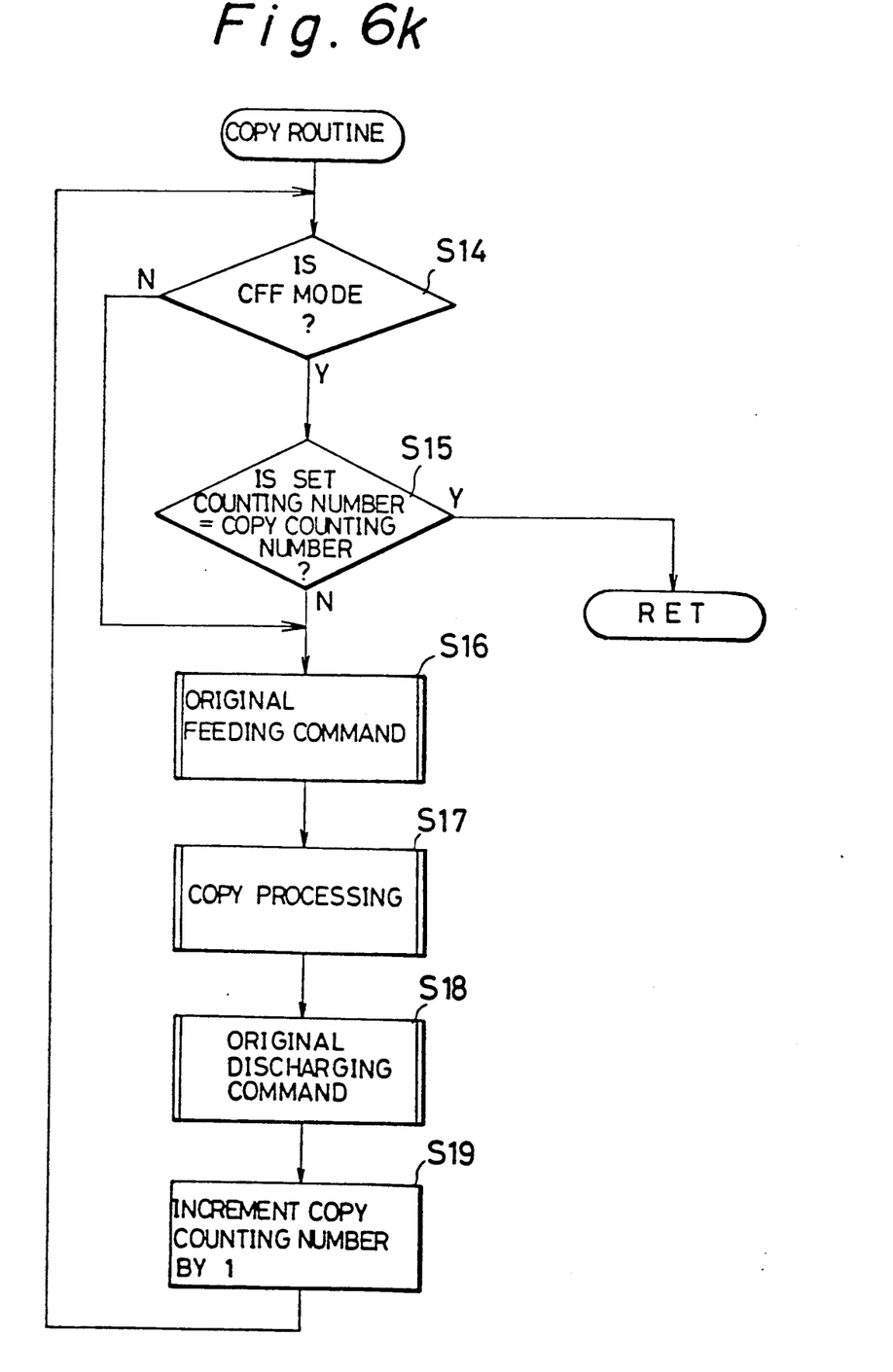
Figure 6L:
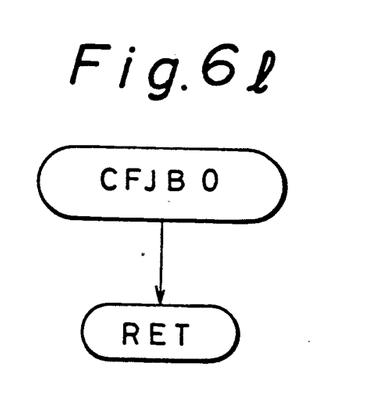

In a copying routine shown in FIG. 6k, when the CF paper is arranged on the platen, the ADF transmits that the ADF is operating in the CFF mode onto the copying machine side by the CF paper detecting sensor SN7. The copying machine checks by the comparator 440 (step S15) whether or not the counting number of copied sheets of the original is in conformity with the set counting number of copies of the original only in the CFF mode (step S14). When these numbers do not conform to each other, the copying machine transmits the original paper feeding command onto the ADF side (step S16). When the originals are separated from each other and therefore the judging result is NO in the step S14, the ADF feeds the next original from the original setting table 60 by the paper feeding command in the step S16. In the CFF mode, as shown in FIG. 6a, the ADF does not perform the paper feeding operation. When the copy processing in a step S17 in the copying machine is completed, the original discharging command is transmitted onto the ADF side to discharge the copied original so as to set the next original (step S18). The ADF performs the sequential operations shown in FIGS. 6a to 6j on the basis of the original discharging command from the copying machine, and then moves the CF paper by one page amount. The copying machine increases the counting number of copies of the original by one every time when the original discharging command is outputted to the ADF (step S19). These sequential operations are repeatedly performed until the counting number of copied sheets of the original is in conformity with the set counting number of copies of the original. When these numbers conform to each other and therefore the judging result in the step S15 is YES, the copying operation is completed and the operation of the ADF is also completed.

Figure 7:
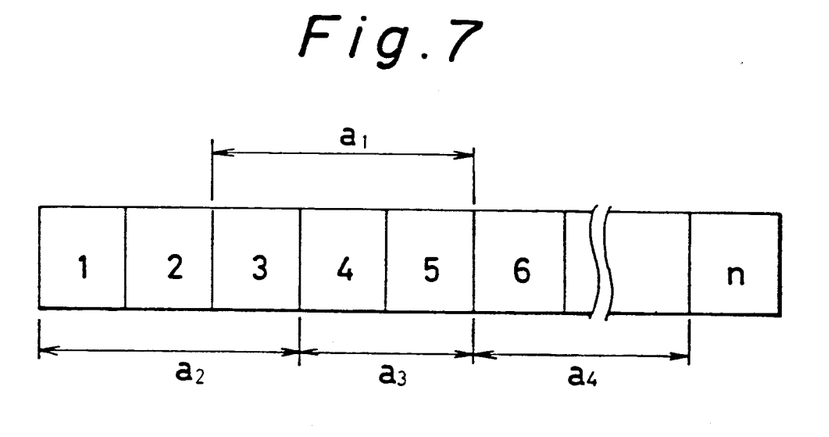
FIG. 7 is a diagram for explaining the copying operation and showing a copied portion of the CF paper.

As shown in FIG. 7, the copying system of the present invention can perform the copying operation with respect to an intermediate portion $a_1$ of the CF paper and further a portion $a_2$ of the CF paper from the first page to the third page for example. Further, the copying system can perform the copying operation with respect to a portion $a_4$ without copying portion $a_3$ subsequent to the portion $a_2$. In the above embodiment of the present invention, one key-inputting unit 450 is commonly used and is switched by the switch 510, but separate key-inputting units may be used. The ADF in the copying system of the present invention can correspond to the copying operation with respect to both sides of the original. Therefore, when a operator operates the copying machine in error such that the copying operation is performed on both sides of the CF paper, it is necessary to consider that the both side copy can be performed even when both side original and both side copy modes are set although the operator should normally select one side original and both side copy modes. In this case, it is preferable to check the existence of the paper discharging signal in the flow charts in both cases of the original inversion command and the inversion paper discharging command.

As mentioned above, in accordance with the present invention, it is possible to copy only a necessary portion of the CF paper by the designation thereof without separating this necessary portion from the other portions of the continuous CF paper.

Many widely different embodiments of the present invention may be constructed without departing from the spirit and scope of the present invention. It should be understood that the present invention is not limited to the specific embodiments described in the specification, except as defined in the appended claims.

What is claimed is:

1. A copy system having an automatic document feeder for feeding a continuous original including a plurality of sheets to said copy system, comprising:
    means for inputting at least one sheet number corresponding to at least one sheet of said original to be copied, said sheet numbers being assigned sequentially on a plurality of said sheets of the original, wherein said at least one sheet number may correspond to any of said plurality of sheets of said continuous original;
    means for counting the number amount of said sheets of said original which are fed by said automatic document feeder, based on output signals outputted from said automatic document feeder at every copy processing, said output signals for feeding and discharging said original;
    means for comparing at every copy processing said sheet numbers inputted by said inputting means with said counted number amount of sheets of said counting means;
    copying machine body control means for controlling the copying operation of the copying system; and
    feeding control means for outputting commands to said automatic document feeder so as to feed and discharge the originals until said counted number amount of the sheets of the original is in conformity with said inputted at least one sheet number of the original to be copies, and for outputting a copy processing signal to said copying machine control means.

2. A copying system as claimed in claim 1, wherein said original comprises a continuous computer form paper.

3. A copying system as claimed in claim 2, wherein a necessary portion of said continuous computer form paper is copied by commanding the sheet numbers without separating this necessary portion from the other portions of the paper.

4. A copying system as claimed in claim 1, wherein the command for feeding the sheets of the original is transmitted to the automatic document feeder when the counted number amount of the sheets of the original is not in conformity with the inputted sheet numbers of the original to be copied.

5. A copying system as claimed in claim 1, wherein the command for discharging the sheets of the original is transmitted to the automatic document feeder when the copying processing by the copying machine is completed.

6. A copying system as claimed in claim 1, wherein the automatic document feeder feeds said original by one sheet number amount thereof on the basis of the paper discharging command from the copying machine.

7. A copying system as claimed in claim 1, wherein the copying operation is completed and the operation of the automatic document feeder is also completed when the counted number amount of the sheets of the original is in conformity with the inputted sheet numbers of the original to be copied.

* * * * *